United States Patent [19]

Veronesi et al.

[11] Patent Number: 5,320,856
[45] Date of Patent: Jun. 14, 1994

[54] METHOD OF MAKING COMPLEX FOOD ARTICLES HAVING PROLONGED SHELF-LIFE

[75] Inventors: Sergio Veronesi, Cinisello Balsamo; Ernesto Buriani, Reggio Emilia, both of Italy

[73] Assignee: Barilla G. E R. F.lli-Societa per Azioni, Parma, Italy

[21] Appl. No.: 962,873

[22] Filed: Oct. 19, 1992

[30] Foreign Application Priority Data

Jun. 19, 1991 [IT] Italy .................... MI 91 A 001683

[51] Int. Cl.⁵ .......................... A23L 3/00; B65B 55/14
[52] U.S. Cl. .................................. 426/392; 426/396; 426/511; 426/521; 426/524
[58] Field of Search .............. 426/392, 396, 511, 521, 426/524

[56] References Cited

U.S. PATENT DOCUMENTS

| | | | |
|---|---|---|---|
| 4,191,787 | 3/1980 | Bauermann | 426/392 X |
| 4,656,042 | 4/1987 | Risler | 426/396 |
| 4,748,028 | 5/1988 | McKenna et al. | 426/392 X |
| 4,882,191 | 11/1989 | Bastetti et al. | 426/511 X |

*Primary Examiner*—Leo B. Tentoni
*Attorney, Agent, or Firm*—Sughrue, Mion, Zinn, Macpeak & Seas

[57] ABSTRACT

Separate independent streams of pumpable and non-pumpable ingredients of a complex food article are first subjected to respective specific thermal stabilization treatments and are then cooled and combined into the desired complex food article which is finally sealed in a package. All the operations are carried out in an aseptic sterile environment.

2 Claims, 1 Drawing Sheet

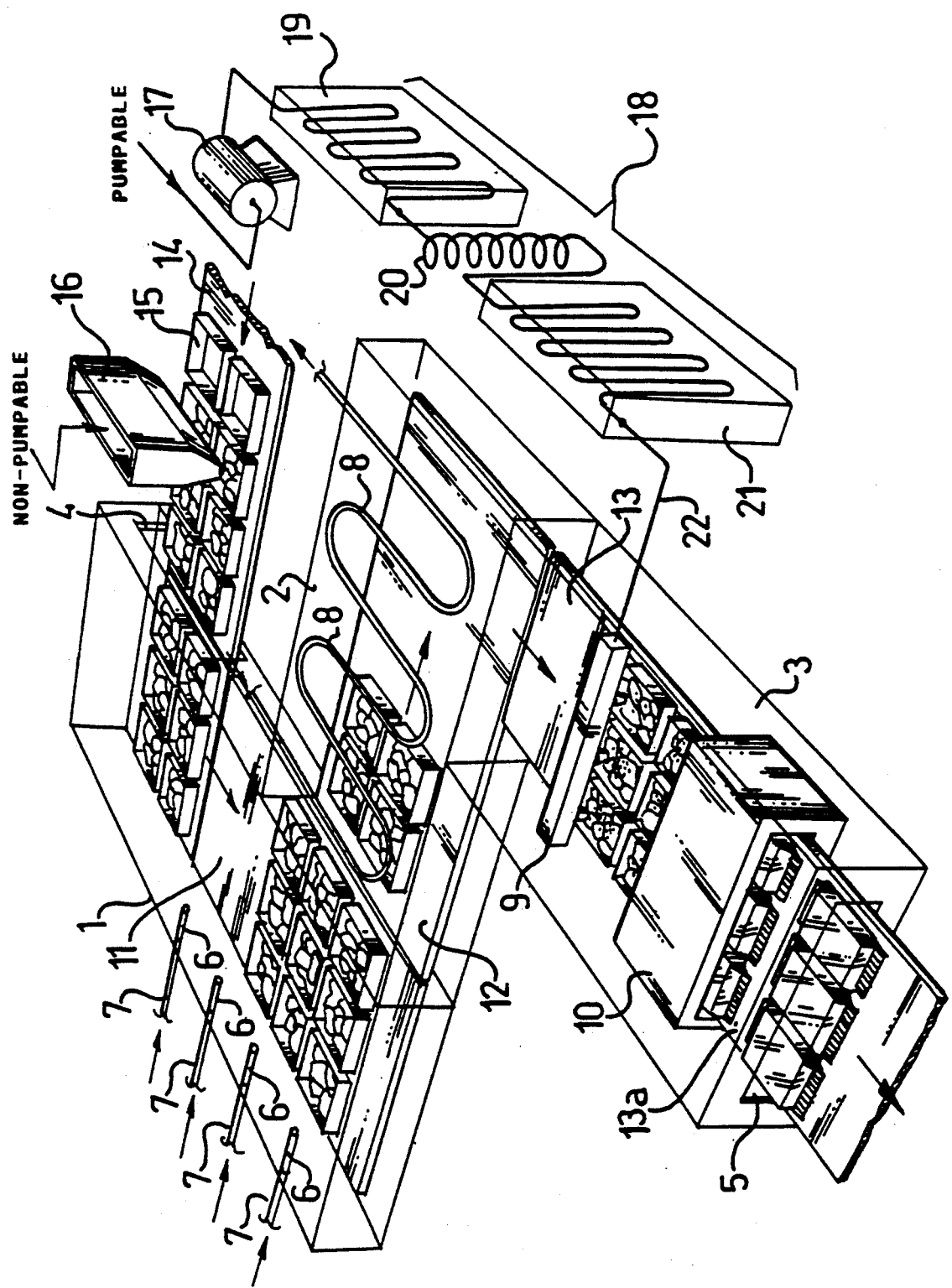

METHOD OF MAKING COMPLEX FOOD ARTICLES HAVING PROLONGED SHELF-LIFE

BACKGROUND OF THE INVENTION

This invention relates, in a general aspect, to a method of producing food articles ready for consumption and having a prolonged shelf-life.

More particularly, the invention relates to a method of thermally stabilizing, cooking, and packaging food articles ready for consumption which are intended for preservation over extended periods and which include one or more non-pumpable ingredients and optionally one or more pumpable ingredients.

In the following description and throughout the appended claims, the expression "non-pumpable ingredient" will be used to indicate:

a solid edible product of any size substantially free from process liquid, a mixture of a liquid and solid particles of an edible product with a liquid-to-solid ratio below 45% and with a particle size below 25 mm, and mixtures comprising a liquid and a particulate solid product with a liquid-to-solid ratio above 45% and a particulate diameter above 25 mm.

As an example, a food article of the aforesaid type may comprise a cooked stuffed pasta product (tortellini, ravioli and the like), dressed with a sauce. Another example is a milk-based cream incorporating big fruit lumps, whole strawberries or the like shrub berries.

Hereinafter in this description and throughout the appended claims, food articles of this kind will be referred to as complex food articles.

In the industrial-scale production of packaged complex food articles ready for consumption and having a prolonged shelf-life, there is a so far unresolved technical problem which schematically comprises two basic aspects.

A first aspect is represented by the difficulty of subjecting the food article to an adequate thermal treatment of stabilization, sterilization and/or cooking. When the thermal treatment is carried out in an autoclave, the solid ingredients of the food article (i.e. the so-called particulate) which vary in size and weight, require fairly long processing times, in the region of 15 minutes, if proper heat penetration is to be achieved, whereas the liquid and semi-liquid ingredients require definitely shorter times (in the region of 5 minutes).

This difference in response to thermal treatment and the paramount importance of providing full sterilization (or sanitization or stabilisation) of the particulate, involve necessarily that the liquid ingredient undergoes an excessive thermal treatment with an inevitable downgrading of its peculiar organoleptic characteristics.

The use of such particular "heat sources" as microwave emitters or the like electromagnetic radiation generators (magnetrons) may reduce to some extent the relevance of the aforesaid technical problem, but fails to eliminate it completely, while it rather adds the difficulty of controlling and regulating such heat sources.

A second aspect of the technical problem mentioned above is represented by the presence of non-pumpable solid ingredients. In fact, owing to the unavailability of a continuous stream of the food article through the thermal treatment station, the treatment should be carried out discontinuously with a recognized consequent productivity decrease.

SUMMARY OF THE INVENTION

The above-mentioned technical problem is fully solved by a method according to the invention which comprises the following steps:

providing a first and a second stream of pumpable and non-pumpable ingredients respectively, said streams being separate and independent of each other;

feeding continuously the first stream of pumpable ingredients to a respective thermal stabilization treatment in a sterile environment, followed by cooling in said environment;

delivering metered amounts of non-pumpable ingredients from said second stream into open, substantially tray-like containers;

transporting said containers through a sterile chamber wherein the metered amounts of non-pumpable ingredients are subjected to a thermal treatment by means of stabilizing and/or sterilizing and/or cooking steam, with simultaneous thermal sanitization of the containers;

cooling the non-pumpable ingredients thus obtained, in a sterile environment;

delivering respective metered amounts of stabilized pumpable ingredient into the open containers comprising said metered amounts of stabilized non-pumpable ingredients, so as to obtain a complex food article;

sealing said containers including the complex food article so as to provide airtight packages; and discharging the resultant packages from the sterile environment.

BRIEF DESCRIPTION OF THE DRAWINGS

Further features and advantages of the invention will be more clearly apparent from the following description of an embodiment of a method according to the invention, given with reference to the attached drawing figure which shows in schematic form an apparatus for carrying out the method.

DETAILED DESCRIPTION OF THE INVENTION

In the drawing, an apparatus for producing long-life packaged, complex food articles for direct consumption comprises three sterile chambers 1, 2, 3, which are connected to one another to form a substantially Z-shaped assembly.

Chamber 1 has an inlet opening 4 for products to be processed, and chamber 3 has a discharge opening 5 for the processed products.

The openings 4 and 5 are provided with conventional aseptic barrier means, not shown, effective to allow said products to move through them while ensuring that sterile and aseptic conditions be maintained inside the assembly comprising the chambers 1, 2 and 3.

Sterile chamber 1 is provided with a plurality of steam-dispensing nozzles 6 distributed along the entire chamber length and connected with respective steam supply lines, all indicated at 7.

Sterile chamber 2 is provided with conventional cooling means, schematically represented by a pipe coil 8 of a suitable heat exchanger.

A liquid metering head 9 is installed within sterile chamber 3 upstream of a so-called closing/sealing machine 10 for containers in general.

The metering head 9 and the closing/sealing machine 10 will not be described in any detail, being conventional and known per se.

An assembly of stepwise moving conveyors, also conventional and no further described, extends from the inlet opening 4 to the outlet opening 5. A first conveyor 11 extends through the sterile chamber 1 (the product thermal stabilization chamber) from the inlet side thereof under the steam-dispensing nozzles 6; a second conveyor 12 extends through the sterile chamber 2 (the cooling chamber) under the pipe coil cooler 8, and a third conveyor 13 extends through the sterile chamber 3, under the liquid-dispensing head 9, to the closing sealing machine 10. A conveyor end section 13a extends from this closing machine 10 to the discharge opening 5 for discharging packaged processed products from the apparatus.

A step conveyor 14 is connected to the inlet opening 4 of chamber 1 and carries tray-like containers 15 of a type normally used for packaging food articles ready for consumption.

A metering head 16 for delivering solid products (non-pumpable particulate) is supported over the conveyor 14. This metering head 16 is also quite conventional and no further described herein.

Shown laterally of the chambers 1, 2 and 3 assembly is a pumpable-ingredient processing line. Schematically, this line comprises a feed pump unit 17 connected to a treatment unit 18 of the so-called HTST (High Temperature Short Time) type. The treatment unit 18 includes a high-temperature heating tubular exchanger 19, a pipe coil 20 for keeping the heated product at the imparted temperature, followed by a cooling tubular exchanger 21. The high-temperature thermal treatment unit 18 is in liquid communication with the liquid-dispensing head 9, supported inside the sterile chamber 3, through a conduit 22.

According to the method of the present invention, the production of packaged complex food articles ready for consumption and having extended shelf like is carried out by splitting the complex food article to be produced into pumpable and non-pumpable ingredients—liquids, solids, and particulates—so as to form two separate and independent streams.

The stream of the non-pumpable ingredients is fed to the metering head 16, from which is delivered out into the underlying containers 15 transported to the inlet opening 4 of the first sterile chamber 1 by the step conveyor 14. Within the chamber 1, the containers and the respective doses of non-pumpable ingredients undergo an appropriate thermal treatment which is effected using a steam flow. The steam characteristics—temperature, pressure, humidity—may be readily selected by a skilled artisan in order to accomplish the desired thermal treatment. The latter should sterilize and/or stabilize and/or cook the non-pumpable ingredient and is related to the residence time of each container inside the sterile chamber 1. It should be noted that, simultaneously with the heat treatment, the tray-like container is also sanitized.

In the most frequent instances, the sterilization of the non-pumpable ingredients is effectively carried out at temperatures between 115° C. and 125° C., pressures from 1.60 to 2.30 atm and residence times within the thermal treatment zone of from 5 to 20 minutes, depending on the size of the ingredients being treated.

It should also be observed that, for cooking some non-pumpable ingredients, the thermal treatment may be carried out using a water/steam combination, in which case the method further includes a subsequent step of draining the cooking water out of the containers.

On completion of the thermal treatment step, the containers are cooled while transported through the sterile chamber 2. In order to have a final product at approximately 25° C., optimum cooling temperatures may vary from 10° C. and 20° C., under an overpressure of 2 to 20 mm $H_2O$ and a relative humidity of 30% to 60%. Thereafter, the containers with their respective doses of stabilized (and/or sterilized and/or cooked) non-pumpable ingredients are conveyed to the liquid metering head 9.

The other stream, i.e. the stream of pumpable ingredients, is fed by means of the pump 17 to the high-temperature treatment unit 18. In this quite conventional unit, the liquid ingredients, are heated to a stabilization (sterilization and/or cooking) temperature of about 124°–128° C. and maintained at this temperature for a selected time, usually of from 1 to 3 minutes. The liquid ingredients are then cooled and fed to the metering head 9 inside the sterile chamber 3.

The method of this invention includes now a "reconstitution" step of the pumpable (liquid semi-liquid) and non-pumpable (solid particulate) ingredients, which have undergone specific and independent thermal treatments. This reconstitution takes place under the metering head 9 itself. The following step in the method of this invention includes closing and sealing operations of the containers, carried out by using preferably oxygen- and steam-tight films and in any case in accordance with techniques and means conventional in the art.

It will be appreciated that the above method may also be applied to the treatment of complex food articles containing exclusively non-pumpable ingredients. In this case, only the closing/sealing machine 10 would be working in the sterile chamber 3.

The main advantages over conventional methods for producing complex food articles which provide for thermal treatment of sealed packages in an autoclave are as follows:

possibility of setting specific treatment times to match the characteristics of the individual ingredients; and treatment of the non-pumpable ingredients in an open-package condition and, therefore, using a heating fluid, preferably steam, in direct contact with the ingredients, without intervening closure films or the like barriers and without the presence of any air pockets (headspace) to lower the efficiency of heat transfer.

Additionally, the use of steam affords a wide choice of temperature and humidity values at which the thermal treatment can be carried out while retaining the desired organoleptic qualities of the product being processed.

Some non-limitative examples of complex food articles prepared in accordance with the invention will now be given herein below with reference to the apparatus shown in the annexed drawing FIGURE.

EXAMPLE 1

Artichoke Sauce

Each tray-like container 15 was loaded with 150 g of artichoke cut into pieces possessing an average size of 50×40×25 mm, which were then subjected to thermal treatment. This treatment, lasting about 10 minutes and being applied within chamber 1 kept at a temperature of 123° C. and under a pressure of 2.2 atm using dry saturated steam at 3 atm, simultaneously provided sterilized containers and cooked artichoke pieces. The containers were then allowed to cool within sterile chamber 2, kept at a temperature of 10° C. maintained at an overpressure of 10 mm H$_2$O (1 mbar) and relative humidity of 50%, using a pre-cooled sterile airflow. In each container were then added 350 g of a sauce prepared in the following manner: tomato pulp, starch, spices and salt were added to chopped onion browned in a pan on direct flame with oil for about 1 minute; the resulting mixture was allowed to stew for 5 minutes. Subsequently, the sauce was subjected to sterilization at a temperature of 125° C. for 2 minutes within the HTST unit 18. A cooled sauce was then delivered by the unit 18 and while still in an aseptic condition to the liquid metering head 9 which dosed the sauce in each tray-like container 15.

After this addition, each container was sealed in aseptic chamber 3 using a suitable conventional plastics film.

In each package, the complex food article included a substantially tomato-based sauce containing lumps of artichoke (non-pumpable particulate), wherein the tomato retains its fresh properties thanks to the rapidity of the HTST thermal treatment, specific for pumpable liquid products.

EXAMPLE 2

Milk Cream with Fruit and Cereals

Each tray-like container 15 was loaded with 180 g of sliced apricot (preferably, apricots cut in halves) and 20 g of barley pre-cooked in water, which were then subjected to sterilization using steam at 118° C. for 12 minutes. After cooling in aseptic sterile chamber 2, 200 g of a sterile milk cream which had been prepared by mixing together under stirring milk, powdered milk, starch and sugar, were added into each tray-like container after sterilization in unit 18.

Each container was then sealed with a suitable conventional plastics film.

EXAMPLE 3

Cuttlefish in Tomato Sauce

Each tray-like container 15 was loaded with 150 g of washed cuttlefishes, which were then cooked and subjected to thermal stabilization using steam at 118° C. for 15 minutes. After draining out the cooking liquid and cooling in aseptic conditions, 300 g of a previously prepared sterile tomato sauce were added into each container. The tray-like 15 containers, which had been sterilized during the aforesaid thermal treatment, were then sealed with a suitable and conventional plastics film.

The tomato sauce was prepared by browning garlic in oil and subsequently adding the resulting mixture to the other sauce ingredients (tomato pulp, starch, spices and salt); after stewing for 2 minutes, this mixture was then treated in the HTST treatment unit 18.

The final package included a fish-based complex food article wherein the cuttlefish had been steam-cooked in its own juice, later removed and replaced with a tomato sauce which showed all the organoleptic properties of freshly-prepared tomato sauce.

EXAMPLE 4

Sauce of Mushroom and Cream

"Julienne"-chopped ham was added to sliced, salted and slightly fried mushrooms and was allowed to flavor for 5 minutes.

170 g of the above preparation were dosed into each tray-like container 15 and then subjected to sterilization using steam at 121° C. for 7 minutes. After cooling in aseptic conditions, a cream sauce obtained by cold mixing together starch, milk cream and spices was then dosed in each container after sterilization in the HTST unit 18.

Each container was then closed in aseptic chamber 3 using a suitable conventional plastics film.

EXAMPLE 5

Stewed Fruit Compote 360 g of fruit including 72 g of chopped apple, 72 g of banana slices, 72 g of grape, 72 g of chopped pineapple, and 72 g of strawberries, 12 g lemon juice and 28 g sugar were dosed into each tray-like container.

The latter was then sterilized using steam at 118° C. for 20 minutes. After aseptic cooling in sterile chamber 2, each container was sealed by means of a suitable conventional plastics film.

EXAMPLE 6

Vegetables 400 g of chopped vegetables including potato sticks, carrot slices, peas, dwarf marrow sticks and Brussels sprouts were dosed into each tray-like container 15. The mixture was then cooked and sterilized using steam at 118° C. for 15 minutes. After removing the cooking liquid, each container was allowed to cool aseptically in sterile chamber 2 and was subsequently sealed, in aseptic chamber 3, using a suitable conventional plastics film

What is claimed is:

1. A method for producing complex food articles ready for consumption and having prolonged shelf-life, which includes pumpable and non-pumpable ingredients, comprising the following steps:
    providing a first and a second stream of pumpable and non-pumpable ingredients respectively, said streams being separate and independent of each other;
    feeding continuously the first stream of pumpable ingredients to a respective thermal stabilization treatment in a sterile environment, followed by cooling in said environment:
    delivering metered amounts of non-pumpable ingredients from said second stream into open, substantially tray-like containers;
    transporting said containers through a sterile chamber wherein the metered amounts of non-pumpable ingredients are subjected to a thermal treatment by means of steam, with simultaneous thermal sanitization of the containers;
    cooling the non-pumpable ingredients thus obtained in a sterile environment,
    delivering respective metered amounts of stabilized pumpable ingredient into the open containers comprising said metered amounts of stabilized non-pumpable ingredients so as to obtain a complex food article;
    sealing said containers including the complex food article so as to provide airtight packages; and
    discharging the resultant packages from the sterile environment.

2. A method according to claim 1, comprising a thermal treatment step includes stabilization and cooking with steam and water, and a subsequent draining step of cooking water.

* * * * *

UNITED STATES PATENT AND TRADEMARK OFFICE
CERTIFICATE OF CORRECTION

PATENT NO. :   5,320,856

DATED     :   June 14, 1994

INVENTOR(S) :  Sergio VERONESI et al.

It is certified that error appears in the above-identified patent and that said Letters Patent is hereby corrected as shown below:

```
On the title page, item [30] Foreign Application Priority Data
   "Jun. 19, 1991[IT] Italy..................MI 91 A 001683"
     should be deleted.
```

Signed and Sealed this

Fourth Day of April, 1995

Attest:

BRUCE LEHMAN

Attesting Officer     *Commissioner of Patents and Trademarks*